May 13, 1952 N. FEINER ET AL 2,596,138
AMPLIFIER WITH MUTING MEANS
Filed Nov. 4, 1949
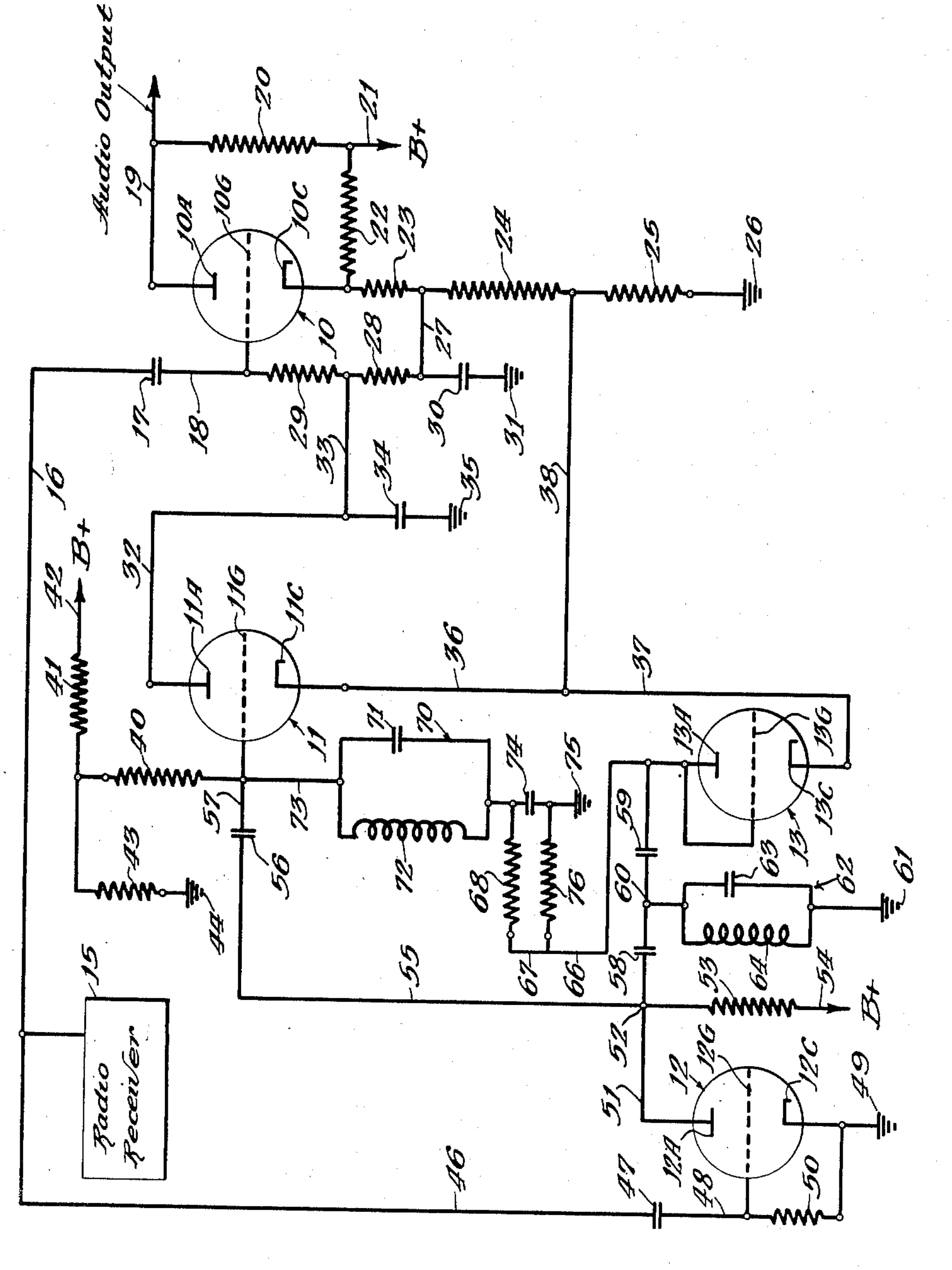
INVENTORS:
Nathaniel Feiner
Samuel H. Gershater
BY
Wallace and Cannon
Attorneys Patented May 13, 1952

2,596,138

UNITED STATES PATENT OFFICE 2,596,138

AMPLIFIER WITH MUTING MEANS

Nathaniel Feiner and Samuel H. Gershater, Chicago, Ill., assignors to Functional Music, Inc., Chicago, Ill., a corporation of Illinois Application November 4, 1949, Serial No. 125,424

3 Claims. (Cl. 179—171)

This invention relates to amplifiers and particularly to electronic amplifiers that are utilized in association with radio receivers and the like.

In connection with radio broadcasting, it has been proposed to derive additional revenue from broadcasting operations by affording specialized service to restaurants, bars, retail stores and the like so that the commercial announcements that are broadcast may be eliminated in such retail establishments so as to thereby afford purely musical entertainment in such establishments.

In such instances it has been proposed that the amplifiers be governed by means responsive to an inaudible signal impressed on the carrier wave either as a subsonic or a supersonic signal, but in accordance with the arrangements heretofore suggested, it has been necessary to use a continuous control signal during the entire period covered by the commercial announcement. It is, therefore, an important object of the present invention to enable such control of an amplifier to be attained by means that are relatively simple and inexpensive in character, and which are responsive to relatively short control signals. More specifically, it is an object of the present invention to enable such control to be attained by means that are electronic in character in all of the elements thereof, and a related object is to enable such control to be attained by relatively short start and stop signals which are of different frequencies.

Other and further objects of the present invention will be apparent from the following description and claims and are illustrated in the accompanying drawing which, by way of illustration, shows a preferred embodiment of the present invention and the principle thereof and what we now consider to be the best mode in which we have contemplated applying that principle. Other embodiments of the invention embodying the same or equivalent principle may be used and structural changes may be made as desired by those skilled in the art without departing from the present invention.

In the drawing, the single figure constitutes a schematic wiring diagram illustrating an amplifier embodying the features of the invention.

For purposes of disclosure, the invention is herein illustrated as embodied in an amplifier having a main amplifying tube 10, and control means including a pair of control amplifying tubes 11 and 12 and a rectifying tube 13 associated with the main amplifying tube 10 in such a way that the main amplifying tube 10 may be rendered conductive or non-conductive at will through the application of inaudible control signals to the tube 12. The main amplifying tube 10 and the control amplifying tube 12 are, as herein shown, associated with a signal source such as a radio receiver 15, so that the program signal and the control signals are derived, after detection, from the common source as represented by the radio receiver 15. As herein shown, the signal from the radio receiver 15 is amplified through a single stage of amplification by the amplifying tube 10, this tube having an anode 10A, a cathode 10C and a control grid 10G. The grid 10G is connected through a wire 16, a condenser 17 and a wire 18 to the radio receiver 15 so as to receive the signal output from the radio receiver, and the amplified output of the tube 10 is transmitted to the audio output by means including an audio output connection 19. As herein shown, the audio output connection is connected through a resistance 20 to a positive B-voltage source, as at 21, and from the connection 21, a resistor 22 is connected to the cathode 10C. The cathode 10C is also connected through resistors 23, 24 and 25 in series to ground as indicated at 26.

Between the resistors 23 and 24, a wire 27 is extended so as to be connected to one end of a resistor 28, the other end of which is connected to a resistor 29, which in turn has its other end connected to the grid 10G. At the juncture of the wire 27 with the resistor 28, an audio bypass condenser 30 has one of its terminals connected, the other terminal being connected to ground as at 31.

The control tube 11 has an anode 11A, a cathode 11C and a control grid 11G, and the anode 11A is connected by wires 32 and 33 in series to the juncture of the resistors 28 and 29. The wire 33 is also connected to one terminal of a condenser 34, the other terminal of which is connected to ground as at 35. The cathode 11C is connected by wires 36 and 37 in series to the cathode 13C of the rectifying tube 13, and a wire 38 extends from the wire 36 to the juncture of the resistors 24 and 25.

The control tube 11 has a fixed value positive voltage applied thereto at all times, and this is accomplished by connecting resistors 40 and 41 in series from the grid 11G to a positive B-voltage source as indicated at 42, the juncture of the resistors 40 and 41 being connected through a resistor 43 to ground as indicated at 44.

The output of the radio receiver 15 is also applied to the control grid of the amplifer tube 12, this tube 12 having an anode 12A, a cathode 12C and a control grid 12G, and the output of the radio receiver 15 being applied to the grid 12G through a wire 46, a condenser 37 and a wire 48 in series. The cathode 12C is connected to the ground at 49 and a bias resistor 50 is connected between the cathode and the grid. The anode or plate 12A is connected by a wire 51 to a terminal 52, this terminal being connected through a resistor 53 to a positive B-voltage source, as indicated at 54. The terminal 52 is connected by a wire 55, a condenser 56 and a wire 57 in series to the grid 11G of the control tube 11.

The rectifying tube 13 has an anode 13A, a grid 13G and a cathode 13C, it being noted that the cathode 13C is connected by the wires 37 and 36 to the cathode 11C of the tube 11, while the grid 13G is connected to the anode 13A so as to afford a diode. The anode 13A is connected to the terminal 52 by condensers 58 and 59 in series, there being a terminal 60 disposed between the two condensers. This terminal 60 is connected to ground at 61 through a tank circuit 62 that includes a condenser 63 and an inductance 64, the condenser 63 and the inductance 64 being connected in parallel between the terminal 60 and ground at 61.

The anode 13A is connected by wires 66 and 67 and a resistance 68 in series to one terminal of a tank circuit 70, this tank circuit being connected at its other end or terminal by wire 73 to the grid 11G of the control tube 11. The end of the tank circuit 70 that is connected to the resistor 68 is also connected through a condenser 74 to ground at 75, and a resistance 76 is connected between the wire 67 and the terminal of the condenser 74 that is connected to ground at 75.

While the circuits may be varied in many ways in accordance with known practice while at the same time utilizing the novel control of the amplifier as taught by the present invention, and while the values of the circuit components may be varied widely in accordance with known practice, we have found that highly satisfactory results are obtained by utilizing circuit components according to the following table of identifying designations and values:

Triode 10—one-half of a 6L7 tube
Triode 11—other half of the 6L7 tube
Triode 12—triode section of a 6SL7 tube
Diode 13—diode-connected other section of the 6SL7 tube

| | | |
|---|---|---|
| Resistor— | | |
| 20 | ohms | 240,000 |
| 22 | do | 240,000 |
| 23 | do | 1,200 |
| 24 | do | 47,000 |
| 25 | do | 20,000 |
| 28 | do | 500,000 |
| 29 | do | 500,000 |
| 40 | do | 500,000 |
| 41 | megohms | 1.2 |
| 43 | ohms | 100,000 |
| 50 | megohms | 1.0 |
| 53 | ohms | 240,000 |
| 68 | do | 240,000 |
| 76 | do | 240,000 |
| Condenser— | | |
| 17 | microfarads | .01 |
| 30 | do | 4.0 |
| 34 | do | .1 |
| 47 | micromicrofarads | 50. |
| 56 | do | 15 |
| 58 | do | 50 |
| 59 | do | 500 |
| 74 | microfarads | 0.1 |
| Tank circuit 62 | resonant at 35 kilocycles | |
| Tank circuit 70 | resonant at 20 kilocycles | |

It will be recognized, of course, that the signal output of the radio receiver 15 will be applied at all times to the grids of the tubes 10 and 12, and the amplified output of the tube 12 is arranged in accordance with the frequency of the received inaudible control signal, as will be described in some detail hereinafter, to govern the conductivity of the control tube 11, the association of the control tube 11 with the grid 10G of the amplifier tube 10 being such that when the control tube 11 is non-conductive, the amplifying tube 10 will be in a conductive condition so that the signal from the radio receiver 15 will be amplified and transmitted to the audio output. The signal from the receiver 15 may be said to be normally amplified by the amplifier tube 10, the bias afforded by the resistor 23 being effective under normal conditions to afford a grid bias which renders the tube 10 conductive. When the amplifier tube 10 is thus rendered conductive, there is a substantial plate current flowing in the plate circuit of the tube 10, and since this plate circuit includes the resistor 25, such substantial plate current flow produces a voltage drop across the resistance 25. This voltage drop is in addition to the voltage drop due to the flow of plate current to the B-voltage connection 21 through the resistor 22. The voltage drop across the resistor 25 affords a positive voltage at the juncture of the resistors 24 and 25, and this voltage is, of course, applied through the wires 38 and 36 to the cathode 11C of the control tube. This positive voltage is of a greater magnitude than the positive voltage that is applied through the resistor 40 to the grid 11G. Thus, the grid 11G under such conditions is sufficiently negative with respect to the cathode 11C so that the tube 11 is maintained non-conductive. It will be evident, of course, that since the tube 11 is non-conductive under such circumstances, there will be no current flow in the plate circuit of the tube 11, and hence, there will be no voltage drop across the resistor 28, this condition being important in governing the conductivity of the main amplifier tube 10, as will hereinafter become apparent. It will be evident, therefore, that so long as the tube 11 remains non-conductive, the normal bias on the amplifying tube 10 will be maintained, and the signal received from the receiver 15 will be amplified by the tube 10 and transmitted to the audio output.

When it is desired to render the amplifying tube 10 non-conductive, as where a commercial announcement or the like is to be transmitted from the broadcasting station, a momentary cutout control signal of an inaudible frequency is transmitted on the carrier wave, and this control signal has the frequency that corresponds with the resonant frequency of the tank circuit 70. Thus, in the present instance, such a control signal would have a frequency of 20 kc. This 20 kc. control signal would thus be applied to the grids of both of the amplifying tubes 10 and 12, but its effective work is accomplished through means including the amplifying tube 12. Thus, the amplified 20 kc. signal is transmitted through the wire 55 and condenser 56 to the grid 11G, and this 20 kc. signal will, of course, be resonant in the tank circuit 70. The peak positive voltages of the 20 kc. signal that is thus resonated in the tank circuit 70 will be effective on the grid 11G, and with the circuit values above set forth, the positive voltage peaks of the resonated signal will be more positive than the positive voltage applied to the cathode 11C through the wires 38 and 36, hence will serve to render the tube 11 conductive. This conduction by the tube 11 serves to cause a pulsating direct current to flow in the plate circuit of the tube 11, and the alternating components of this current are filtered out by the condenser 34 so that a direct current will flow in the plate circuit of the tube 11. This plate circuit includes the resistance 28 and the resistances 23 and 22, and by reason of the current flow in and through the resistor 28, a voltage drop is developed across the resistor 28. This affords additional negative bias that is applied to the control grid 10G of the amplifier tube 10, thereby to render the tube 10 non-conductive. This takes place during the relatively short period when the 20 kc. control signal is being transmitted, and as soon as the tube 10 has become non-conductive, its plate current disappears and the voltage drop across the resistor 25 is reduced below the value that is necessary as hereinbefore described to maintain the tube 11 in its non-conductive state. Hence, when the 20 kc. control signal is terminated, the control tube 11 remains conductive, and this serves to maintain the amplifier tube 10 in its non-conductive state. Thus, the signal that is being applied to the grid of the amplifying tube 10 will not again be amplified and transmitted to the audio output until the tube 11 has been rendered non-conductive.

When the commercial announcement or the like has been completed, and it is again desired to render the amplifier tube 10 conductive, a different frequency inaudible signal is momentarily transmitted on the carrier wave that is being received by the receiver 15. This signal may be termed a restoring signal, and with the values hereinabove set forth, such restoring signal would have a frequency of 35 kc. Such a 35 kc. restoring signal is, of course, applied to the grid of the amplifying tube 12, and the amplified output of the tube 12 is effectually applied to the 35 kc. tank circuit 62. This, of course, develops a voltage which is rectified in the rectifying tube 13, and this rectified output appears at the plate or anode 13A as a negative-going voltage that is applied through the wires 66 and 67, the resistance 68, the element 72 and the wire 73 to the grid 11G of the tube 11. By negative-going voltage we mean a voltage that is becoming more negative, or less positive. This negative-going voltage serves to bias the tube 11 so that the plate current in the tube 11 is sharply reduced. This reduces the voltage drop across the resistor 28 to such a point that the tube 10 is again rendered conductive. The flow of plate current in the tube 10 then causes voltage drop across the resistor 25 which acts to bias the tube 11 to cut-off, as previously described. By reason of the continued current flow in the plate circuit of the tube 10, the bias of the tube 11 to its cut-off relationship is maintained so that upon termination of the 35 kc. restoring signal the amplifying tube 10 remains in its conductive condition wherein the signal from the radio receiver 15 will be continuously amplified and supplied to the audio output.

From the foregoing description it will be evident that the present invention enables commercial announcements or the like to be eliminated from the reproduced program material at selected amplifiers, and enables this to be accomplished in a simple and expeditious manner. It will be apparent also that such control is attained under the present invention through the use of relatively short control signals that need to be transmitted only at the beginning and the end of a period during which the amplifier is to be disabled. The present invention also enables different frequencies to disable and to restore the amplifier.

We claim:

1. In an electronic amplifier, a main amplifier tube embodying a control grid adapted for connection to a signal source and also having an anode and a cathode and having a load circuit affording an audio output connection, said load circuit including a plurality of resistors connected in series with said cathode, a grid bias connection including an additional resistor and the one of said resistors that is adjacent said cathode, a control tube having a grid, an anode and a cathode, a load circuit for said control tube including a connection from the anode of said control tube through said one resistor and said additional resistor and a connection from the cathode of said control tube to a point on the load circuit of said main tube at which during current flow in such last mentioned load circuit has a positive voltage of at least a predetermined magnitude, means operable to apply to the grid of said control tube a constant positive voltage of a magnitude less than said predetermined magnitude, a governing amplifier tube having a load circuit and having a control grid adapted to be connected to a signal source, means connecting said last mentioned load circuit with said grid of said control tube and including a first tank circuit tuned to resonance at a first selected frequency, means including a second tank circuit tuned to resonance at a second frequency and connected between said last mentioned load circuit and ground, a rectifying tube having a load circuit operatively connected to said second tank circuit to rectify the output of said second tank circuit, and means connecting said grid of said control tube to said load circuit of said rectifying tube at a point, which during such rectifying action of said rectifying tube, has a negative-going voltage effective to reduce the current flow in the load circuit of said control tube and thus return said main amplifying tube to a conductive state.

2. In an electronic amplifier, a main amplifier tube embodying a control grid adapted for connection to a signal source and also having an anode and a cathode and having a load circuit affording an audio output connection, said load circuit including a plurality of resistors connected in series with said cathode, a grid bias connection for said grid including an additional resistor and the one of said resistors that is adjacent said cathode, a control tube having a grid, an anode and a cathode, a load circuit for said control tube including a connection from the anode of said control tube through said one resistor and said additional resistor and also including a connection from the cathode of said control tube to a point on the load circuit of said main tube which during current flow in such last mentioned load circuit has a positive voltage of at least a predetermined magnitude, means operable to apply to the grid of said control tube a constant positive voltage of a magnitude less than said predetermined magnitude, means for rendering the bias on said control tube positive to initiate conduction in said control tube, and means for reducing the positive bias on said control tube for rendering said control tube non-conducting.

3. In an electronic amplifier, a main amplifier tube embodying a control grid adapted for connection to a signal source and also having an anode and a cathode and having a load circuit affording an audio output connection, said load circuit including a plurality of resistors connected in series with said cathode, a grid bias connection for said grid including an additional resistor and the one of said resistors that is adjacent said cathode, a control tube having a grid, an anode and a cathode, a load circuit for said control tube including a connection from the anode of said control tube through said one resistor and said additional resistor and also including a connection from the cathode of said control tube to a point on the load circuit of said main tube at which during current flow in such last mentioned load circuit has a positive voltage of at least a predetermined magnitude, means operable to apply to the grid of said control tube a constant positive voltage of a magnitude less than said predetermined magnitude, bias-changing means for rendering the bias on said control tube positive to initiate conduction in said control tube, and means for reducing the positive bias on said control tube for sharply reducing the current flow in said control tube.

NATHANIEL FEINER.
SAMUEL H. GERSHATER.

REFERENCES CITED

The following references are of record in the file of this patent:

UNITED STATES PATENTS

| Number | Name | Date |
|---|---|---|
| 2,250,596 | Mountjoy | July 29, 1941 |
| 2,507,432 | Bass | May 9, 1950 |